US006724620B1

(12) United States Patent
Arbogast et al.

(10) Patent No.: US 6,724,620 B1
(45) Date of Patent: Apr. 20, 2004

(54) LOW PROFILE TOOL-LESS MOUNTING ADAPTER

(75) Inventors: Porter Rodgers Arbogast, Fort Collins, CO (US); Arlen L. Roesner, Fort Collins, CO (US); David W. Mayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/285,794

(22) Filed: Oct. 31, 2002

(51) Int. Cl.$^7$ ................................. H02B 1/00
(52) U.S. Cl. ...................... 361/685; 361/682; 361/679; 361/825
(58) Field of Search ................. 361/685, 683, 361/679, 825, 682, 759, 740, 732, 726, 747

(56) References Cited

U.S. PATENT DOCUMENTS

| 5,595,501 | A | * | 1/1997 | Ho ........................... 439/377 |
| 5,734,557 | A | | 3/1998 | McAnally |
| 5,921,644 | A | | 7/1999 | Brunel et al. |
| 6,176,001 | B1 | | 1/2001 | Boe |
| 6,226,179 | B1 | | 5/2001 | Lee |
| 6,275,377 | B1 | | 8/2001 | Liu et al. |
| 6,275,382 | B1 | | 8/2001 | Siedow et al. |
| 6,304,457 | B1 | | 10/2001 | Liu et al. |
| 6,351,376 | B1 | | 2/2002 | Liang et al. |
| 6,366,457 | B1 | | 4/2002 | Otto et al. |
| 6,392,879 | B1 | | 5/2002 | Chien |
| 6,396,686 | B1 | | 5/2002 | Liu et al. |
| 6,404,624 | B1 | | 6/2002 | Jeong |
| 6,418,012 | B1 | | 7/2002 | Dials et al. |
| 2002/0085358 | A1 | | 7/2002 | Homer et al. |

* cited by examiner

Primary Examiner—David Martin
Assistant Examiner—Hung Bui
(74) Attorney, Agent, or Firm—Kevin M. Hart (57) ABSTRACT

A mounting adapter a peripheral device. A strip is adapted to fit across the top or bottom of the device transversely. First and second device engagement tabs engage holes on left and right sides of the device, and first and second chassis engagement tabs engage holes on left and right sides of a chassis opening. The chassis engagement tabs and one of the device engagement tabs are disposed on arms that can be moved elastically in the transverse direction to engage and disengage the tabs with their corresponding holes. The adapter can be fashioned from a unitary piece of metal, and adds only the thickness of the strip to the vertical dimension of the peripheral device.

14 Claims, 9 Drawing Sheets

LOW PROFILE TOOL-LESS MOUNTING ADAPTER

FIELD OF THE INVENTION

This invention relates to techniques for mounting peripheral equipment such as media drives in computer enclosures.

BACKGROUND

Most computer enclosures are designed to contain one or more peripheral devices such as media drives. Examples of such peripheral devices might include, for example, a DVD ROM drive, a CD ROM drive, a CD Writer, a magnetic disk drive, or the like. Typically, a peripheral device is mounted to the enclosure through an opening in a wall or panel of the computer chassis. While many techniques have been devised to attach a peripheral device to a chassis, the most convenient techniques for doing so are those that do not require the use of tools. For example, U.S. Pat. No. 5,921,644 ("Brunel") and U.S. Pat. No. 6,275,382 ("Siedow") each disclose a mounting adapter for a peripheral device wherein tools are not required for attaching the adapter to the device or for attaching the adapter to the computer enclosure. Since the contributions of Brunel and Siedow, however, computer enclosures and peripheral devices have become lower in profile. In addition, a practical requirement remains for being able to vertically stack as many devices as possible within the confines of an enclosure. It would therefore be desirable to have a tool-less drive mounting adapter for use in a low-profile environment.

SUMMARY OF THE INVENTION

A mounting adapter according to the invention may be used with a peripheral device having longitudinal and transverse dimensions such that the device slides into a chassis opening with its longitudinal dimension orthogonal to the opening. A strip is adapted to fit across the top or bottom of the device transversely. First and second device engagement tabs are provided for engaging holes on left and right sides of the device, and first and second chassis engagement tabs are provided for engaging holes on left and right sides of the chassis opening. The chassis engagement tabs and one of the device engagement tabs are disposed on arms that can be moved elastically in the transverse direction to engage and disengage the tabs with their corresponding holes. The adapter can be fashioned from a unitary piece of metal, and adds only the thickness of the strip to the vertical dimension of the peripheral device.

DETAILED DESCRIPTION OF THE PREFERRED EMBODIMENTS

FIGS. 1–5 illustrate a peripheral device mounting adapter 100 according to a preferred embodiment of the invention. Adapter 100 may be fashioned from a unitary piece of metal such as stainless steel sheet metal using a progressive die or another suitable sheet metal fabrication process. The adapter could also be fabricated from other materials such as plastic.

Figures 6, 7, 8, 9:
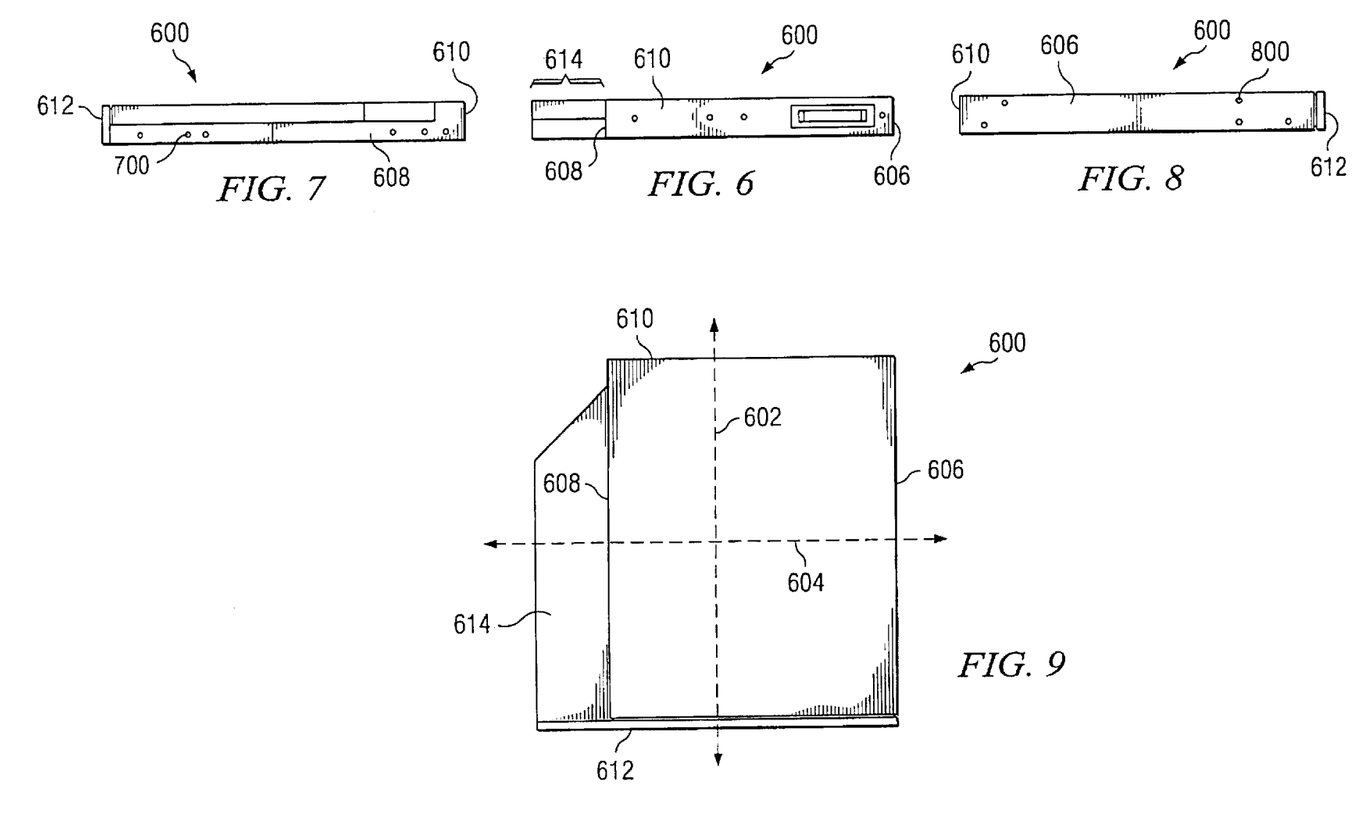
FIGS. 6 is a back view of a peripheral device.
FIGS. 7–10 are left side, right side, bottom and top views, respectively, of the peripheral device of FIG. 6.
Figure 10:
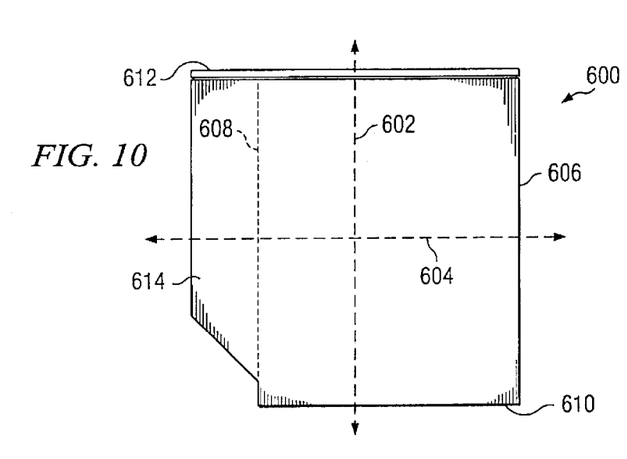
Figure 15:
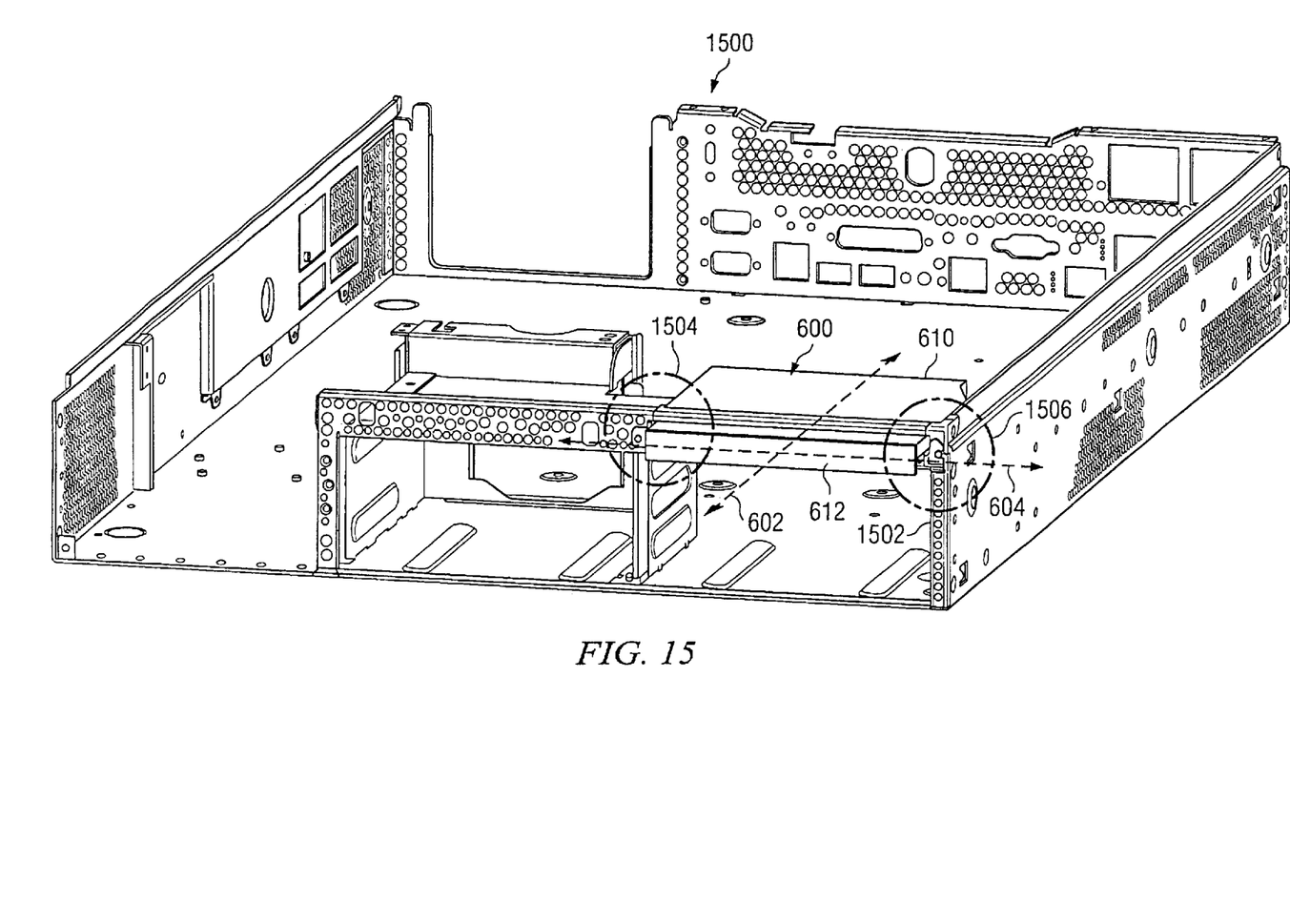
FIG. 15 is an oblique view of a computer chassis having the adapter of FIG. 1 and the peripheral device of FIG. 6 installed in a drive bay.
Figure 16:
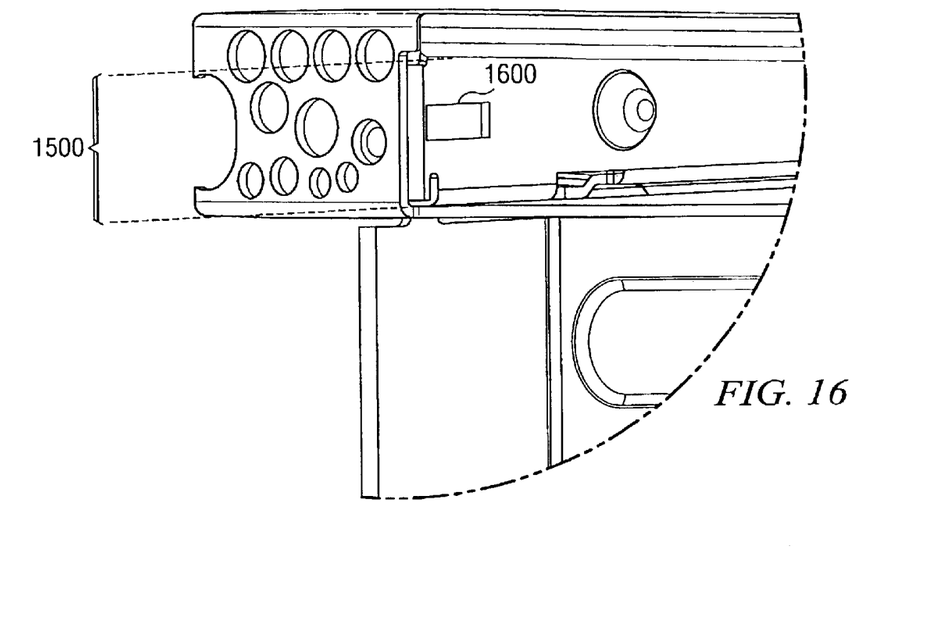
FIG. 16 is a close-up view of one side of the drive bay of FIG. 15 without the peripheral device or the adapter present.

For purposes of illustration herein, use of adapter 100 with a DVD-ROM drive 600 will be described in detail. It should be understood, however, that the invention as described and claimed herein is not limited to use of the adapter with a DVD-ROM drive. Rather, adapter 100 may be used with any peripheral device having a longitudinal dimension 602 and a transverse dimension 604, where the peripheral device is designed to slide into a chassis opening 1502 with its longitudinal dimension 604 orthogonal to opening 1502 as shown in FIG. 15.

Figure 12:
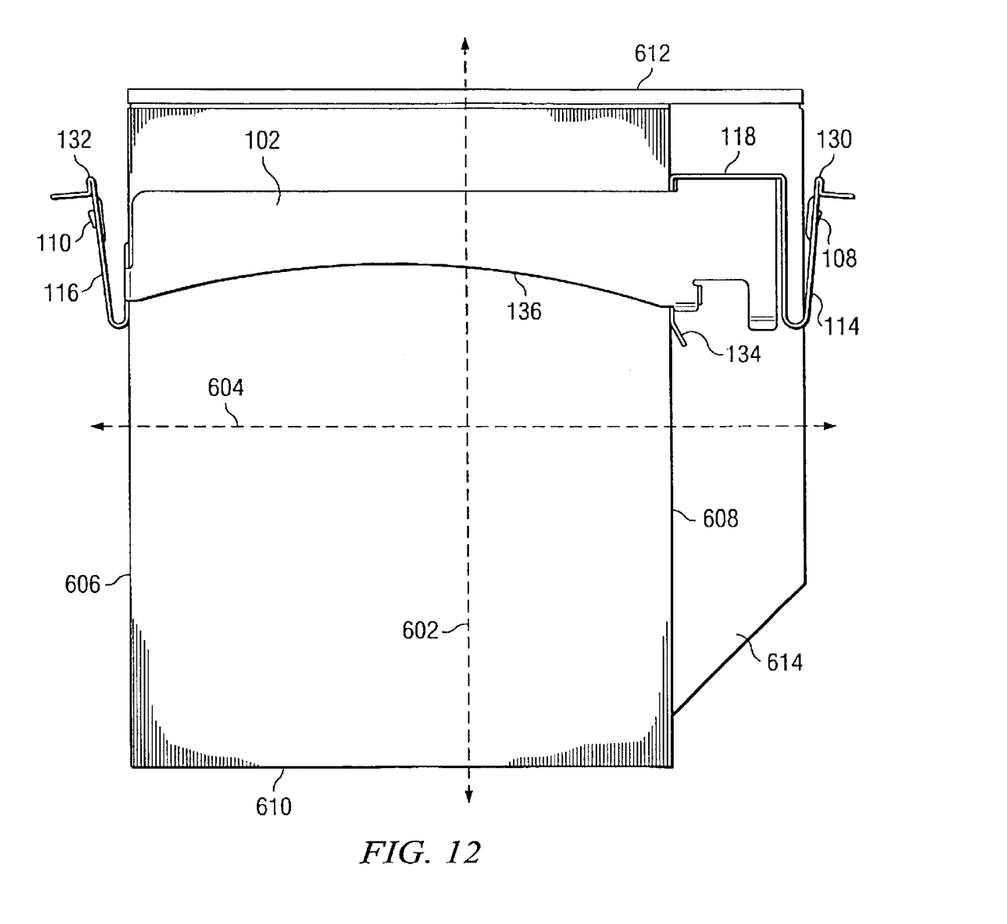
FIGS. 12–14 are bottom, top and back views illustrating the adapter of FIG. 1 having been attached to the peripheral device of FIG. 6.

Adapter 100 includes a strip 102 adapted to fit across device 600 transversely (as shown, for example, in FIG. 12). Adapter 100 may be designed so that strip 102 fits across either the top of the device or the bottom device. In the illustrated embodiment, strip 102 fits across the bottom of device 600. Device engagement tabs 104, 106 are provided on opposite ends of strip 102 for engaging holes 700, 800 on left and right sides of device 600. In the illustrated embodiment, tab 104 engages hole 700 on right side 608, and tab 106 engages hole 800 on left side 606. In other embodiments, tabs 104, 106 maybe adapted to engage different holes in device 600 or holes on different sides. Moreover, the holes into which the adapter tabs are engaged may be standard threaded holes of device 600 or custom holes. Adapter 100 also includes chassis engagement tabs 108, 110 for engaging holes 1600 on left and right sides of chassis opening 1502.

Chassis engagement tabs 108, 110 are disposed on chassis engagement arms 114, 116, respectively. Device engagement tab 104 is disposed on device engagement arm 112. Each of arms 112, 114 and 116 can be moved elastically back and forth in transverse dimension 604 as indicated by arrows 113, 115 and 117. The excursion of the arms should be sufficient to engage and disengage the tabs with their corresponding holes. In the illustrated embodiment, a stop 119 is provided to prevent excessive retraction of arm 112.

Although arms 112, 114 may be fashioned in numerous ways, a preferred technique is to provide a support member 118 orthogonal to strip 102. One end of arms 112, 114 is secured to support member 118 as shown at 120, 122. Particularly if strip 102 is made of metal, support member 118 may be created by bending a portion of strip 102 approximately 90 degrees from the plane of the strip. Then arm 112 maybe formed by bending (120) a portion of support member 118 approximately 90 degrees from the plane of support member 118. Arm 114 may be formed by bending (122) a portion of support member 118 approximately 90 degrees, and then bending (124) that portion back on itself approximately 180 degrees to form a substantially u-shaped piece.

Similarly, another support member 126 may be provided at the other end of strip 102. Device engagement tab 106 maybe disposed on support member 126, and chassis engagement arm 116 may be secured to support member 126 at one end 128. Support member 126 may be formed by bending a portion of strip 102 approximately 90 degrees from the plane of the strip. And arm 116 may be formed by bending (128) a portion of support member 126 back on itself approximately 180 degrees.

In embodiments made from materials other than metal, the terms "bend" and "bending" herein shall simply refer to the final shape of the adapter. For example, in a plastic design, the bends could be achieved with molding.

Touch points 130, 132, 134 may be provided on arms 114, 116, 112, respectively. Finger pressure may be applied to the touch points to move the arms back and forth in transverse direction 604. In the embodiment shown, touch points 130, 132 face the front end 612 of device 600, and touch point 134 faces the back end 610 of device 600.

Figure 1:
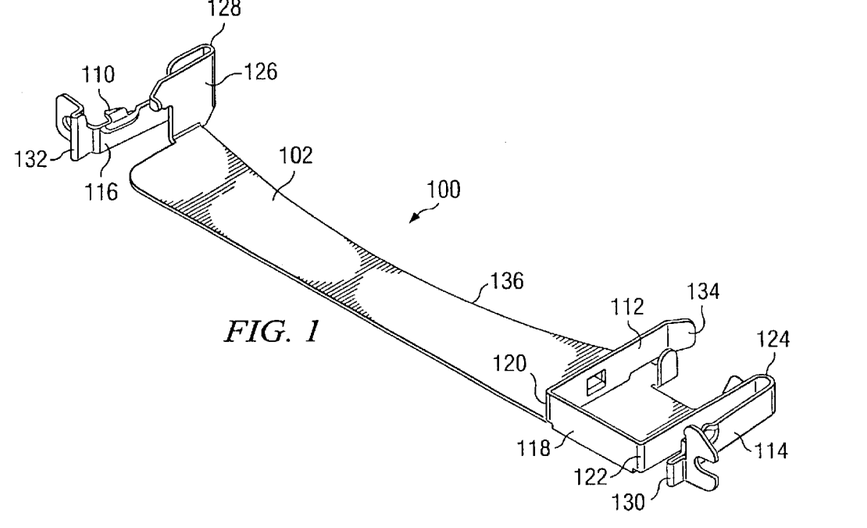
FIG. 1 is an oblique view of a mounting adapter according to a preferred embodiment of the invention.
Figure 2:
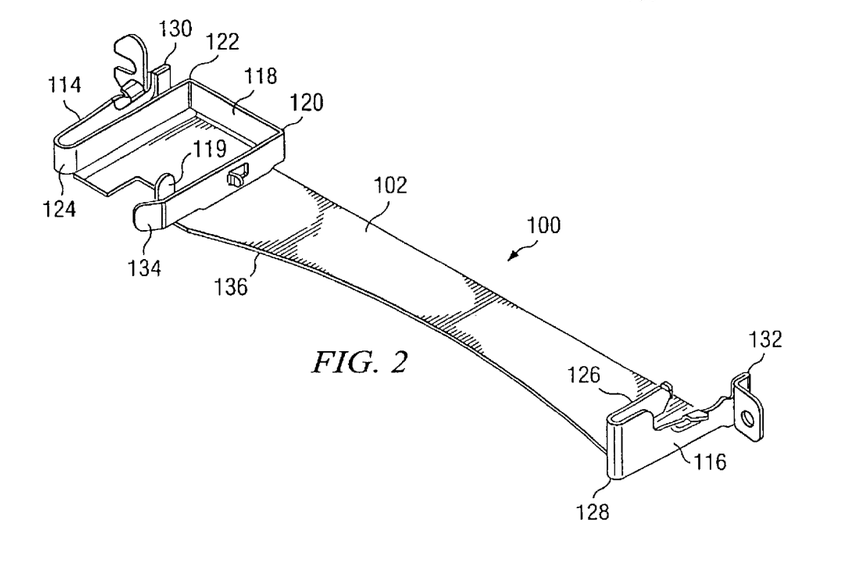
FIG. 2 is a reverse oblique view of the adapter of FIG. 1.
Figure 3:
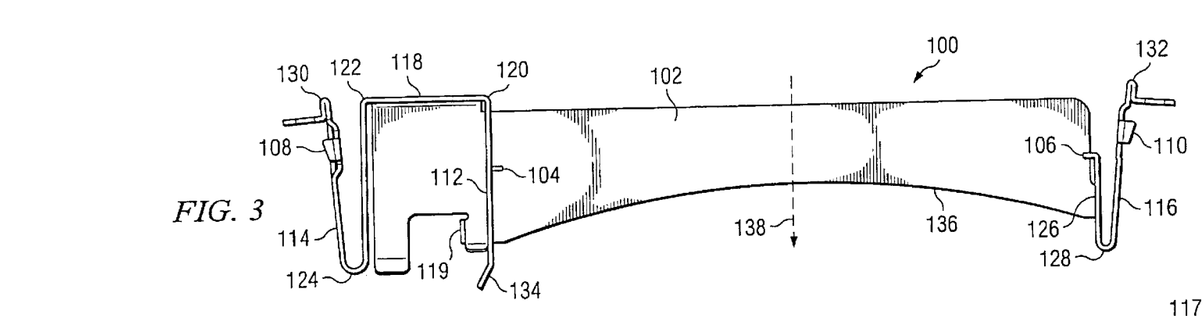
FIG. 3 is a top view of the adapter of FIG. 1 showing a device engagement arm in an engaged position.
Figure 4:
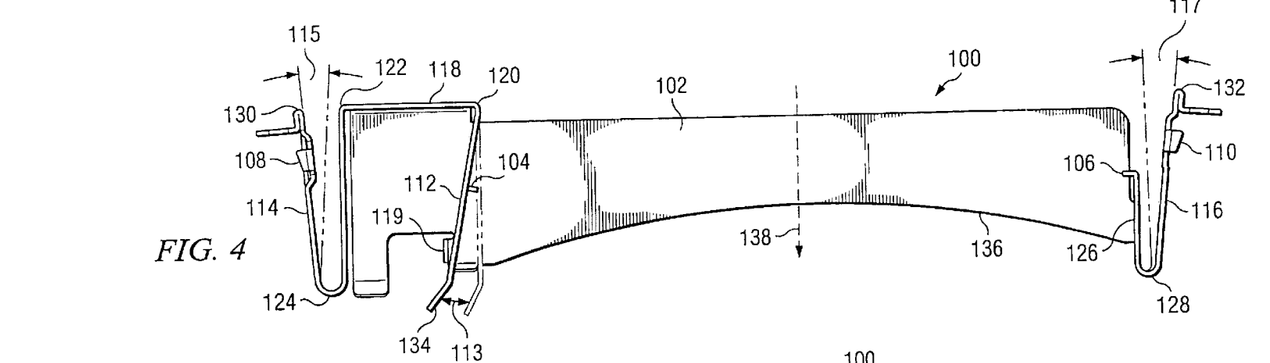
FIG. 4 is a top view of the adapter of FIG. 1 showing the device engagement arm in a retracted position.

Optionally, the edge 136 of strip 102 that faces the longitudinal insertion direction 138 of device 600 may be concave, as shown. Such a contour may help to prevent catching strip 102 on surfaces of drive bay 1800 as device 600 is inserted therein.

Figure 5:
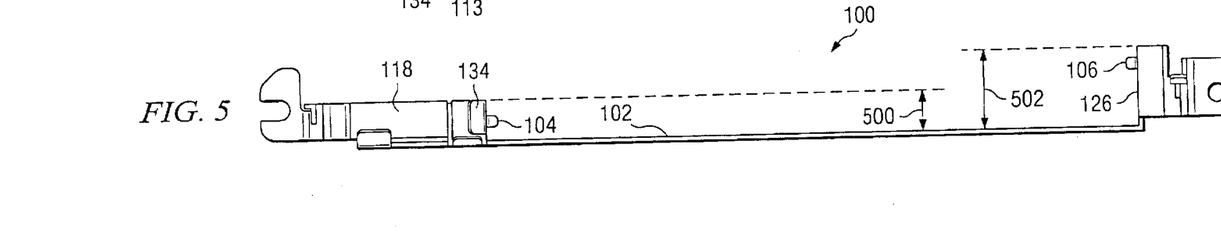
FIG. 5 is a back view of the adapter of FIG. 1.

As was mentioned above, adapter 100 may be used with a wide variety of peripheral devices. The standard form factor of some peripheral devices, including some DVD-ROM drives, includes an overhang portion 614 on one of its sides 608. In the illustrated embodiment, adapter 100 is designed to accommodate overhang 614. Specifically, the height 500 of support member 118 maybe small enough so that support member 118 and arm 112 fit underneath overhang 614 as shown if FIG. 14. In such an embodiment, the height 502 of support member 126 may optionally be larger than height 500.

Figure 11:
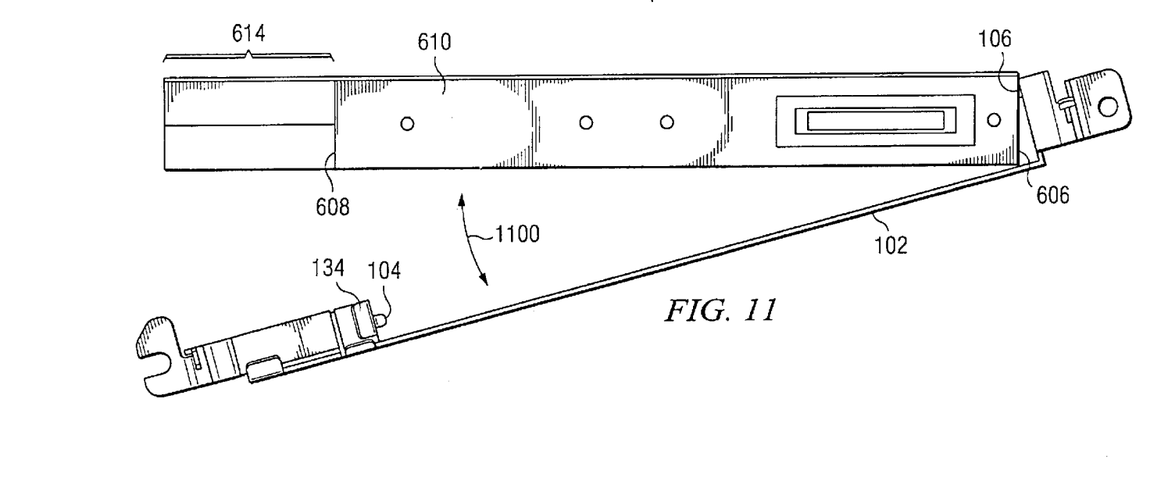
FIG. 11 is a back view illustrating a preferred manner of attaching the adapter of FIG. 1 to the peripheral device of FIG. 6.
Figure 13:
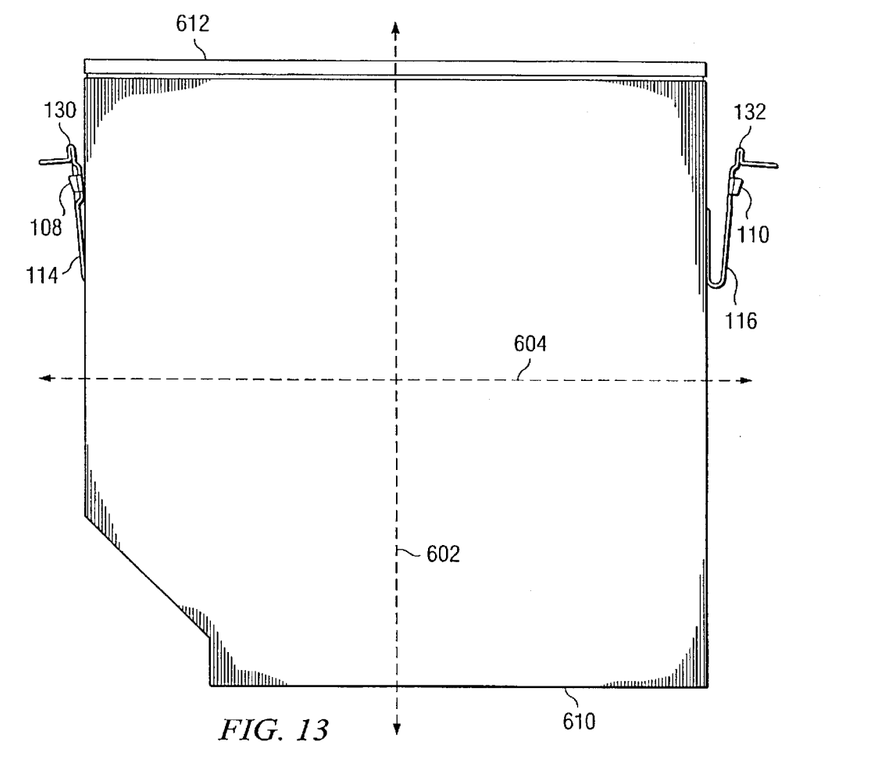
Figure 14:
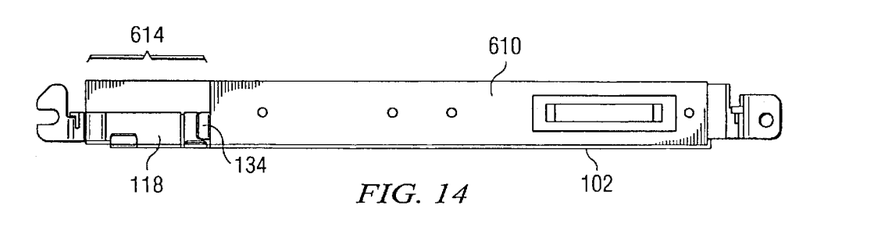

FIG. 11 illustrates a preferred manner of attaching adapter 100 to device 600. First, device engagement tab 106 may be engaged with hole 800 on side 606 of device 600. Then, strip 102 may be rotated toward the bottom of the device 600 as indicated by arrow 1100. As arm 112 approaches side 608, finger pressure may be applied to touch point 134 to retract the arm, so that tab 104 may be engaged with hole 700. Once this is accomplished, adapter 100 is secured to device 600 as shown in FIGS. 12–14.

Figure 17:
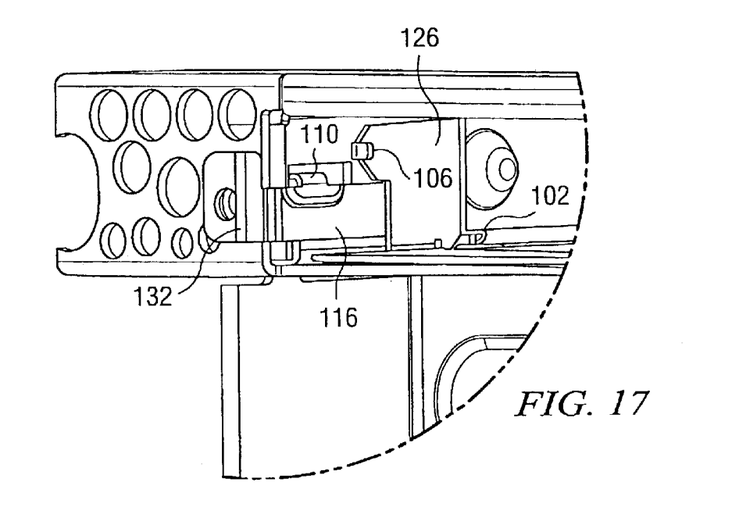
FIG. 17 is a close-up view of the drive bay of FIG. 16 with the adapter present but without the peripheral device present.
Figure 18:
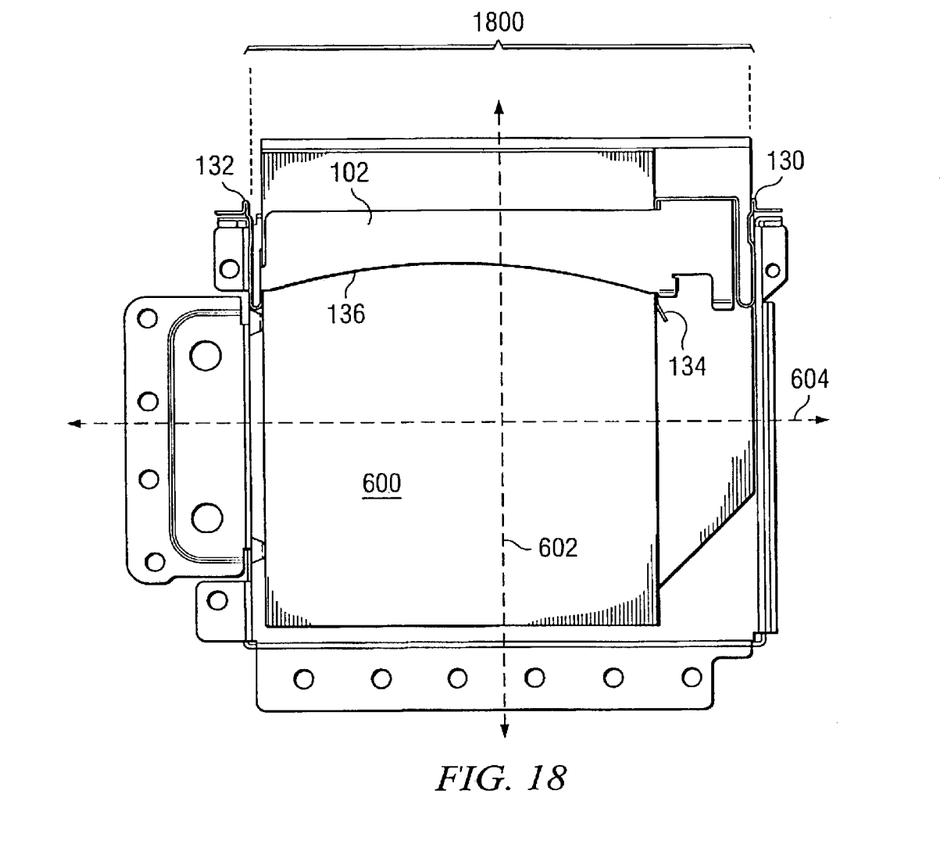
FIG. 18 is a bottom view of the peripheral device and the adapter installed in the drive bay of FIG. 16, with bottom supporting surfaces of the drive bay removed for clarity.

Referring now to FIGS. 15–18, drive bay 1800 in chassis 1500 should include a hole 1600 on each of the left and right sides 1504, 1506 of the drive bay for receiving tabs 108, 110. (Drive bay 1800 may, of course, include bottom supporting surfaces to provide additional support for device 600.) Once adapter 100 has been secured to device 600, device 600 may simply slide into bay 1800 in longitudinal direction 602. The sawtooth shapes of tabs 108, 110 cause arms 114, 116 to retract automatically as adapter 100 enters bay 1800. Then, when insertion has proceeded a little farther, tabs 108, 110 snap into holes 1600, as shown in FIG. 17. The sawtooth shape of the tabs prevents adapter 100 from inadvertently moving back out of bay 1800. To remove device 600 from the bay, finger pressure may be applied at touch points 130, 132, and device 600 may then be pulled out of the bay in longitudinal direction 602.

What is claimed is:

1. A mounting adapter for a peripheral device, the device having longitudinal and transverse dimensions and operable to slide into a chassis opening with its longitudinal dimension orthogonal to the opening, the adapter comprising:
   a strip adapted to fit across the top or bottom of the device transversely;
   first and second device engagement tabs for engaging holes on left and right sides of the device; and
   first and second chassis engagement tabs for engaging holes on left and right sides of the chassis opening;
   wherein the chassis engagement tabs and the first device engagement tab are disposed on arms that can be moved elastically in the transverse direction to engage and disengage the chassis engagement tabs and the first device engagement tab with their corresponding holes.

2. The mounting adapter of claim 1, wherein:
   the chassis engagement tabs are disposed on chassis engagement arms; and
   the first device engagement tab is disposed on a device engagement arm.

3. The mounting adapter of claim 2:
   further comprising a first support member orthogonal to the strip; and
   wherein the device engagement arm and one of the chassis engagement arms are each secured at one end to the first support member.

4. The mounting adapter of claim 3, wherein:
   the first support member comprises a portion of the strip that is bent approximately 90 degrees from the plane of the strip.

5. The mounting adapter of claim 4, wherein:
   the device engagement arm comprises a portion of the first support member that is bent approximately 90 degrees from the plane of the first support member.

6. The mounting adapter of claim 4, wherein:
   the chassis engagement arm that is secured to the first support member comprises a portion of the first support member that is bent approximately 90 degrees from the plane of the first support member, and then is bent back on itself approximately 180 degrees to form a substantially u-shaped piece.

7. The mounting adapter of claim 3:
   further comprising a second support member orthogonal to the strip; and
   wherein the other one of the device engagement tabs is disposed on the second support member, and the other chassis engagement arm is secured at one end to the second support member.

8. The mounting adapter of claim 7, wherein:
   the second support member comprises a portion of the strip that is bent approximately 90 degrees from the plane of the strip.

9. The mounting adapter of claim 8, wherein:
   the chassis engagement arm that is secured to the second support member comprises a portion of the second support member that is bent back on itself approximately 180 degrees.

10. The mounting adapter of claim 2, wherein:
    each of the arms comprises a touch point at which finger pressure may be applied to move the arm;
    the touch points of the chassis engagement arms face toward a front end of the device; and
    the touch point of the device engagement arm faces a back end of the device.

11. The mounting adapter of claim 1, wherein:

the edge of the strip that faces the longitudinal insertion direction of the device is concave.

12. The mounting adapter of claim 3, wherein:

the device comprises an overhang portion that overhangs one of its sides; and the first support member is adapted to fit underneath the overhang portion.

13. The mounting adapter of claim 1, wherein:

the strip, the tabs and the arms comprise a unitary place of metal.

14. The mounting adapter of claim 1, wherein:

at least one of the chassis engagement tabs has a sawtooth shape.

* * * * *